United States Patent [19]
Krishan

[11] Patent Number: 6,115,755
[45] Date of Patent: Sep. 5, 2000

[54] INTEGRATED APPARATUS FOR INTERFACING SEVERAL COMPUTERS TO THE INTERNET THROUGH A SINGLE CONNECTION

[75] Inventor: Baldev Krishan, Fremont, Calif.

[73] Assignee: Novaweb Technologies, Inc., Fremont, Calif.

[21] Appl. No.: 09/057,805

[22] Filed: Apr. 9, 1998

[51] Int. Cl.[7] ............................ H04L 12/54; H04L 12/66; G06F 13/00
[52] U.S. Cl. .......................... 709/250; 709/200; 709/202; 709/231; 709/249; 370/351; 370/352; 370/401; 370/463
[58] Field of Search ..................................... 709/200–206, 709/227–229, 231, 245–246, 248–250; 370/351–352, 401–404, 463–465

[56] References Cited

U.S. PATENT DOCUMENTS

| | | | |
|---|---|---|---|
| 5,406,557 | 4/1995 | Baudoin | 709/246 |
| 5,610,910 | 3/1997 | Focsaneanu et al. | 370/351 |
| 5,678,041 | 10/1997 | Baker et al. | 709/229 |
| 5,737,333 | 4/1998 | Civanlar et al. | 370/352 |
| 5,737,525 | 4/1998 | Picazo, Jr. et al. | 709/250 |
| 5,761,433 | 6/1998 | Billings | 709/251 |
| 5,790,548 | 8/1998 | Sistanizadeh et al. | 370/401 |
| 5,815,681 | 9/1998 | Kikinis | 709/250 |

*Primary Examiner*—Zarni Maung
*Assistant Examiner*—Bharat Barot
*Attorney, Agent, or Firm*—Fish & Neave; Nicola A. Pisano; Christopher J. Frerking

[57] ABSTRACT

A plug-in card for use with a personal computer is disclosed, which provides a combination of a modem, a network interface, and a network hub. The card permits the personal computer to share a single connection to a wide area network, such as the Internet with other computers which are connected to the network hub on the card. Integration of a modem, network interface, and network hub onto a single plug-in card provides cost savings, and improved ease of setup and use.

30 Claims, 3 Drawing Sheets

INTEGRATED APPARATUS FOR INTERFACING SEVERAL COMPUTERS TO THE INTERNET THROUGH A SINGLE CONNECTION

FIELD OF THE INVENTION

The present invention relates generally to computer networking, and to coupling a small number of computers, such as might be found in a small office, or home office, to a wide area network, such as the Internet. More specifically, the present invention relates to apparatus that enables multiple computers to share a single connection to the Internet.

BACKGROUND OF THE INVENTION

Over the past few years, the Internet has become a major source of information and a common, world-wide means of communication and commerce. The rapid expansion of the World Wide Web (WWW) has made the Internet a primary means by which many businesses provide product information and advertising, and the number of companies conducting business over the Internet is growing. In addition to business uses, the information resources and entertainment available through the WWW are causing an ever increasing number of households to purchase computer equipment, and establish accounts giving them access to the Internet. With the increasing availability of high-speed access, and low-cost devices designed specifically to provide Internet access, the Internet promises to become the primary communications medium of the next decade.

Gaining access to the Internet is relatively simple for individual users. All that is needed at present is a personal computer equipped with a modem, a telephone line, and a dial-up account with any one of a large number of Internet service providers (ISPs). Most of the required software setup is handled automatically, so the user need not have any great skill with computers or networks. At present, dial-up accounts are inexpensive, typically requiring a modest monthly fee for "unlimited" access to the Internet. The speed of the connection to the Internet depends on the speed of the modem being used for the connection, and is currently less than 56,000 bits per second. Setups of this type typically require a separate modem, telephone line, and ISP account for each machine which has simultaneous access to the Internet.

Faster, more expensive options are available to businesses. A business with a need to have a continuous high-speed link to the Internet, or to have multiple computers connected simultaneously, may lease a high-speed connection through an ISP. The speed and cost of such a connection varies with the type of connection (leased line, ISDN, frame relay, T1, T3), and presently ranges from approximately 128,000 bits per second to many millions of bits per second, at a cost ranging from several hundred dollars to several thousand dollars per month. Continuous high-speed connections are also difficult to set up, typically requiring the services of a network professional to establish the connection, and to provide maintenance when there are problems.

At present, there are few good Internet access solutions available for small businesses or individuals with three or four computers which need occasional access to the Internet. A high-speed continuous connection is much more than is needed, and is far too costly. A typical dial-up connection provides Internet access to only one machine at a time. Connecting four computers to the Internet via dial-up connections would require four separate phone lines, and four separate dial-up accounts, possibly making the cost of such a solution too expensive.

For small office or home office ("SOHO") applications where a local area network (LAN) already exists, there are currently several possible ways of connecting the LAN to the Internet. For example, one machine can be connected to the Internet through a dial-up connection, and can run a "proxy server" to provide Internet access to other machines on the LAN. A proxy server is software which manages Internet traffic on the LAN by re-routing Internet traffic to and from the machines on the LAN. This permits a single Internet connection to be used by several computers on a LAN, and may also provide performance enhancement and security, by caching frequently accessed information, and by monitoring the information going to and from the Internet, and blocking any undesirable communications. Proxy server software is widely used, and numerous commercial, shareware, and freeware proxy servers are available for a variety of computers and operating systems.

Although they are readily available, LANs and proxy servers are not easy to set up. First, it is necessary to connect all of the computers to a local area network. This requires that each computer be provided with the necessary hardware to connect it to a network, and that the necessary software to provide network access be installed and configured on each computer. The computers must then be connected to each other, typically through a network "hub", which retransmits network traffic received from any one of the computers to all of the others which are connected to the hub. Finally, the proxy server software must be installed and configured on the computer having a dial-up connection to the Internet, and all of the other computers on the LAN must be configured to send their Internet traffic through the proxy server. All of these steps require knowledge of computers and networks, and typically must be performed by a skilled technician.

In response to the difficulties associated with setting up and configuring proxy server software, and the fact that running the proxy server software places a considerable demand on the computational resources of the computer which is running it, several companies now offer stand-alone devices which plug into a LAN to provide Internet and modem access to the computers on the LAN. For example, Intel Corporation, of Santa Clara, Calif., offers a stand-alone device called the "InBusiness Internet Station," which incorporates a processor running a pre-configured proxy server, a network connection, and interface circuitry for connecting up to three modems to the device, permitting up to 12 computers to be connected to the Internet through a single dial-up account. Ramp Networks Corporation, of Santa Clara, Calif., offers a similar product, called the "WebRamp M3," which integrates a processor running a proxy server, a network interface, a four-port network hub, and ports for connecting up to three modems into a single stand-alone device. Similar stand-alone network modem nodes are described in U.S. Pat. No. 5,724,356, to Parameswaran Nair et al., and U.S. Pat. No. 5,355,365, to Bhat et al., both of which are incorporated herein by reference.

These stand-alone devices for connecting a LAN to the Internet still have disadvantages that make them unsuitable for use in the SOHO market. First, because they contain most of the essential components of a computer system (i.e. processor, memory, I/O slots or ports, network interface hardware, case, power supply), the stand-alone devices tend to be expensive. Currently, a small business or home user can expect to pay between $400 and $600 for such a device plus the cost of the modems which will be attached (currently, approximately $100–$200 per modem). Additionally, since these devices typically plug into a LAN, it is necessary for the user of the device to set up and configure a LAN, requiring the installation and configuration of numerous network interface cards, and possibly a network hub. The currently available devices also do not typically include a modem. Thus, it is necessary to select, install, and configure numerous network cards, a hub, and one or more modems to use one of these "simple" stand-alone Internet access devices. Such solutions may be far too complex for the typical SOHO user.

In view of the above, it would be desirable to provide a low-cost integrated solution to connect several computers to the Internet through a single dial-up ISP account.

It would further be desirable to provide a device that permits several computers to use a single connection to the Internet, and which provides simple setup and configuration.

SUMMARY OF THE INVENTION

It is an object of the present invention to provide a low-cost integrated means of connecting several computers to the Internet through a single dial-up Internet account.

It is a further object of the invention to provide a means of connecting several computers to the Internet without requiring selection of external equipment, or complex installation and configuration procedures.

These and other objects of the present invention are achieved by providing a card that combines the functions of a modem, a network interface, and a network hub, and which plugs into a standard interface slot (such as ISA or PCI) in a personal computer. The computer into which the card is placed (the host computer) runs proxy server software to route the network traffic, uses the modem circuitry of the card to connect to the Internet, and the network interface and hub circuitry of the card to connect to several other computers. Setup software provided with the card automatically configures the host computer and clients, the proxy server software, the modem, and the network interface. Alternatively, a card constructed in accordance with the present invention may also include a microprocessor to assist the host computer in routing Internet traffic.

In addition to providing automatic setup software, software is provided to permit several computers to use the modem circuitry of the present invention to connect to other modems, to send and receive fax transmissions, and to receive voice mail.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
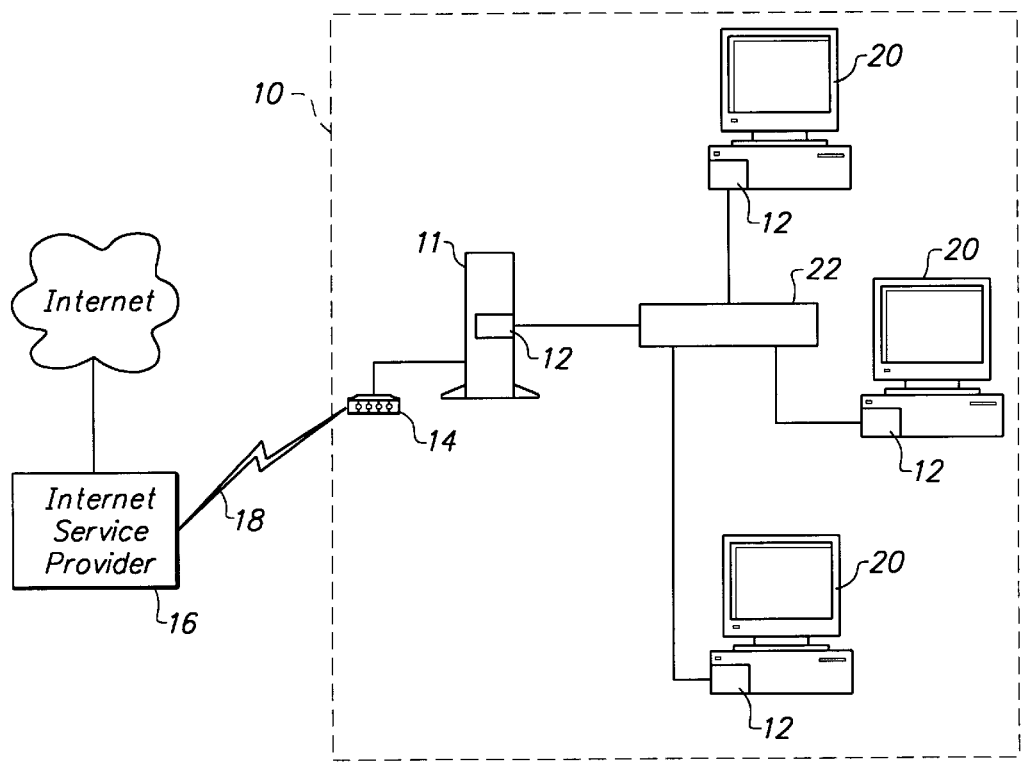
FIG. 1 shows a typical prior-art setup for connecting a LAN to the Internet through a dial-up connection.

FIG. 1 shows a previously known method for connecting a LAN to the Internet through a single dial-up account using known components and network equipment. Server 11 is a computer with a network interface 12 and a connection to modem 14. Server 11 uses modem 14 to connect to Internet service provider 16 through public telephone network 18, and network interface 12 to connect to LAN 10 through network hub 22. Server 11 is programmed to run previously known proxy server software to permit computers 20 (which may be any network devices) on LAN 10 to access the Internet through server 11. Each of computers 20 on LAN 10 has a network interface, and is connected to LAN 10 through network hub 22.

Server 11 may be a complete computer system, similar to computers 20, or it may be a special purpose stand-alone device. If server 11 is a full computer system, it can be used to perform the tasks of any other computer on LAN 10, in addition to running proxy server software. These tasks may include running any of the normal software that may be used on an office computer, such as word processing or web-browsing applications. However, because running the proxy server software may place a heavy processing burden on server 11, thereby causing other applications to run slowly, a relatively high performance computer is typically used to perform the tasks required of server 11.

As mentioned above, server 11 may also be a stand-alone device specifically designed to provide Internet access to a LAN through a single dial-up connection. Using such a device in place of server 11 simplifies setup by providing a pre-configured network interface and proxy server. Additionally, since server 11 is a special purpose device, none of the computers on LAN 10 are burdened by running proxy server software. The main disadvantage of using a special purpose device for server 11 is cost, since server 11 cannot be used as one of the computers on LAN 10.

To set up a LAN with access to the Internet through a dial-up account, such as is shown in FIG. 1, it is necessary to separately purchase, install, and configure multiple network interfaces 12, network hub 22, modem 14, and the proxy server software running on server 11. Knowledge of which components will function when combined in this way, how to setup such a system, and how to configure each device and computer is typically beyond the capability of most SOHO users. Even if server 11 is a pre-configured stand-alone device, setting up a LAN of this sort with access to the Internet through a single dial-up account may require the services of a network technician.

Figure 2:
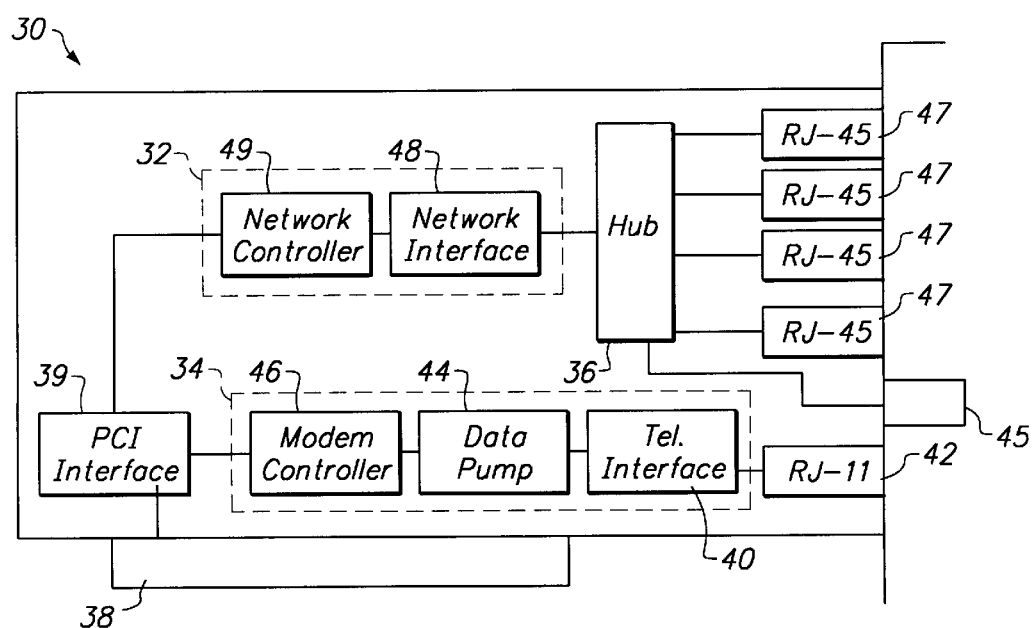
FIG. 2 is a card constructed in accordance with the principles of the present invention.

Referring now to FIG. 2, a card built in accordance with the principles of the present invention is described. Card 30 includes network interface controller circuitry 32, modem circuitry 34, and network hub circuitry 36. Card 30 also preferably includes PCI bus interface 38, and PCI interface circuitry 39, which permit the card to be plugged into the PCI bus of most standard PC compatible computers.

Modem circuitry 34 includes telephone interface circuitry 40, which interfaces modem circuitry 34 to a telephone line through connector 42, which preferably comprises a standard RJ-11 type modular telephone jack. Modem data pump circuitry 44 includes a digital telephone coder-decoder (CODEC) for communicating through telephone interface circuitry 40, and circuitry for performing a variety of functions such as modulation, demodulation, and echo cancellation on signals received through telephone interface circuitry 40. Modem circuitry 34 also includes modem controller 46, which controls modem data pump circuitry 44, and permits modem circuitry 34 to respond to standard modem commands, such as the "Hayes AT-command set", and to handle standard error control and data compression protocols, such as those described in International Telecommunication Union (ITU) recommendations V.42 or V.42bis. Modem circuitry 34 preferably conforms to the telecommunications specifications in ITU recommendations V.90, V.34, V.32bis, V.32, V.23, V.22bis, V.22, and V.21, permitting speeds up to 56,000 bits per second.

Optionally, modem circuitry 34 may be replicated one or more times, providing card 30 with the capability of connecting to more than one telephone line simultaneously. The additional modem circuitry may be used to permit card 30 to handle fax, voice mail, and other modem traffic through the additional modems, while one (or more) of the modems is providing a connection to the Internet through an ISP. Alternatively, the additional modem circuitry can be used to establish multiple simultaneous connections to the Internet through multiple accounts with an ISP, thereby increasing the bandwidth of the Internet access available to the computers on the LAN. When multiple modems are used to provide multiple connections to the Internet, the proxy server software must be configured to split the Internet traffic between multiple Internet connections.

Network interface controller circuitry 32 preferably includes network interface circuitry 48, which connects network interface controller circuitry 32 to network hub circuitry 36, and network controller circuitry 49, which implements an appropriate network protocol. Network interface controller circuitry 32 preferably complies with the IEEE 802.3 standard, providing a 10BASE-T, 10M bit per second Ethernet interface.

Network hub circuitry 36 is connected to network interface controller circuitry 32, and to a plurality of ports 47, which preferably comprise standard RJ-45 type modular jacks. Network hub circuitry 36 repeats any signal received from any of ports 47 or network interface controller circuitry 32 to all other of ports 47 and network interface controller circuitry 32. Network hub circuitry 36 may also be connected to optional cascade port 45, to permit an external network hub to be connected to card 30 to expand the capacity of the network.

The individual elements of circuitries 32, 34, 36, and 39 of card 30 may be constructed in accordance with previously known techniques and form no part of the present invention. Thus, modem circuitry, network controller interface circuitry, network hub circuitry, and PCI interface circuitry are all per se known. Card 30 of the present invention, however, combines all of these elements onto a single card thereby permitting a single configuration program to install these elements in the SOHO environment without the assistance of a network technician. The present invention therefore provides unique cost and usability benefits that are not available with prior art devices.

Card 30 is plugged into an appropriate slot within a host computer, preferably a "PC-compatible" personal computer. The host computer runs driver software which permits it to communicate with card 30, and network software, which permits modem circuitry 34 to be used to connect to the Internet, and network interface controller circuitry 32 and network hub circuitry 36 to be used to communicate with other computers and peripheral devices connected to card 30 through ports 47 and cascade port 45. Additionally, since card 30 does not include a general purpose processor, all routing of Internet traffic is handled by proxy server software running on the host computer. The proxy server software permits multiple computers connected to card 30 through ports 47 and cascade port 45 to access the Internet using a single dial-up connection maintained by modem circuitry 34.

Proxy server software, which routes Internet traffic as described above is per se known, and is commercially available from several sources. Examples of commercially available proxy server software for PC compatible computers include "WinGate", by Deerfield Communications Company, of Gaylord, Mich., and "Microsoft Proxy Server", by Microsoft, of Redmond, Wash.

Advantageously, card 30 may be substantially less costly to produce than other means of providing multiple computers with access to the Internet through a single dial-up connection. Without a general purpose processor, card 30 is less expensive to produce than stand-alone devices, which use a separate processor to run the proxy server software. Card 30 combines the functions of what would otherwise be at least three separate devices, reducing duplication of structure such as circuit boards and bus interface connectors. Cost is further reduced by combining most of the circuitry common to network interface controller circuitry 32, network hub circuitry 36, and modem circuitry 34, reducing duplicated circuitry. Also, since card 30 is placed inside the case of the host computer, and receives power through PCI bus interface 38, card 30 does not require a case or power supply, further reducing the cost. If still further cost reductions are needed, network interface controller circuitry 32, modem circuitry 34, network hub circuitry 36, and PCI interface circuitry 39 could be combined into a single VLSI chip.

In addition to providing Internet access, software may be provided to permit modem circuitry 34 to be operated as a standard modem, to send and receive faxes, and to handle voice mail. Additional server software running on the host computer could make these services available to other computers connected to card 30. Clearly, these capabilities would only be available when modem circuitry 34 is not being used to provide Internet access.

It will be evident to one skilled in the art that numerous modifications could be made to card 30 without departing from the present invention. For instance, modem circuitry 34 could be replaced with a telephone line interface, and the host computer could include a host signal processor (HSP) programmed as a soft modem. Alternatively, modem circuitry 34 could be replaced by ISDN modem circuitry, circuitry for interfacing with a digital subscriber line (DSL), or circuitry for interfacing with a cable Internet service. Similarly, PCI bus interface 38 and PCI interface circuitry 39 may be replaced with a bus interface and interface circuitry for connecting to some other standard bus, such as ISA or PCMCIA, which would also require that the form factor of the card be changed. Network interface controller circuitry 32 and hub circuitry 36 may optionally conform to networking standards other than IEEE 802.3, such as Fast Ethernet (100BASE-T), ATM, or FDDI. Additionally, configurations with more or fewer ports connected to hub circuitry 36 than are shown may be produced.

Figure 3:
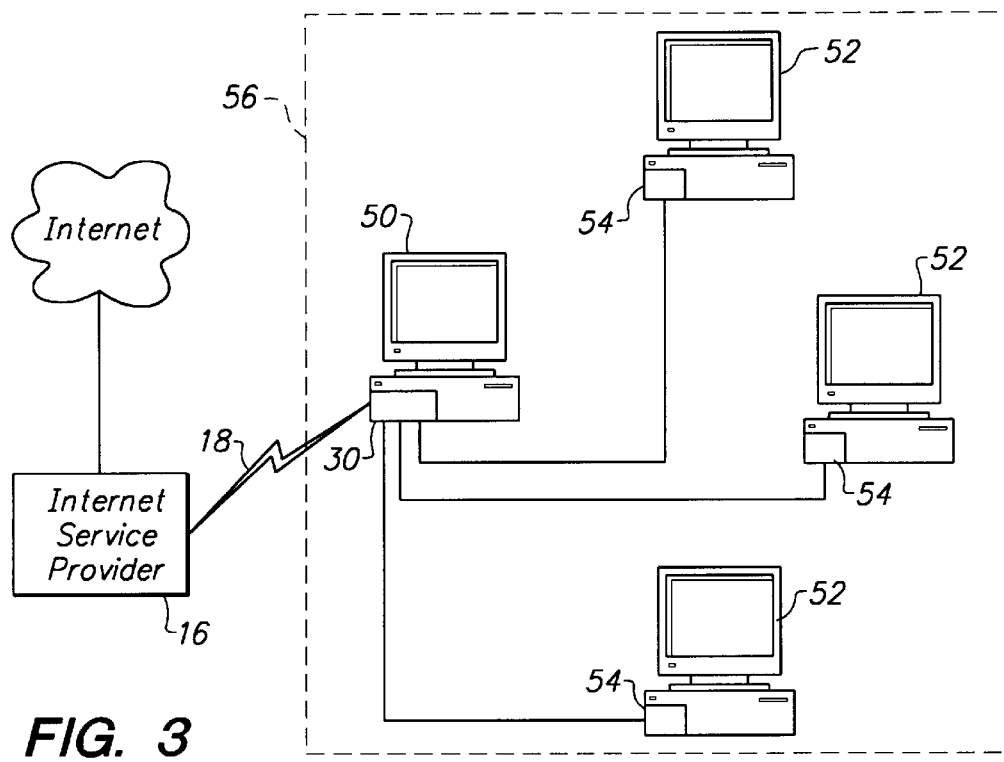
FIG. 3 shows a LAN setup using the card of FIG. 2.

FIG. 3 shows a method for connecting numerous computers to the Internet through a single dial-up account using card 30 of the present invention. Host computer 50 contains card 30 of the present invention, which it uses to connect to Internet service provider 16 through public telephone network 18, and to connect to a plurality of other computers 52, which may optionally include other external devices, such as a network printer. Host computer 50 is programmed to run standard proxy server software to permit computers 52 to access the Internet through host computer 50. Each of computers 52 has a network interface 54, and is connected to host computer 50 through card 30. Computers 52 and host computer 50 are connected together by card 30 to form LAN 56, which permits computers 52 and host computer 50 to take advantage of typical LAN services, such as sharing a printer or other devices.

It should be noted that network interfaces 54 are preferably made specifically to be compatible with card 30, permitting a single installation program to be used on all of computers 52. This installation program automatically configures network interfaces 54 and the network drivers and software running on computers 52 to function properly with host computer 50 and card 30.

Advantageously, card 30 is easy to install and configure. Only one card need be installed in the host computer to provide the functions of a modem, a network interface, and a network hub. Since the functionality of these components is combined, a single setup program may be employed to configure the host computer and card 30, which preferably conforms to the PCI plug-n-play standard. The setup program for card 30 automatically installs and configures all the necessary drivers, network software, and proxy server software, thus requiring only minimal information from the user. Such an automated installation procedure is made possible by the combined functionality of card 30, which provides a synergistic effect not available in previously known systems. By contrast, previously known systems having multiple devices typically require several different installation procedures. For example, incompatibilities caused by having devices from several different manufacturers would make it very difficult to provide a single automatic setup program.

Figure 4:
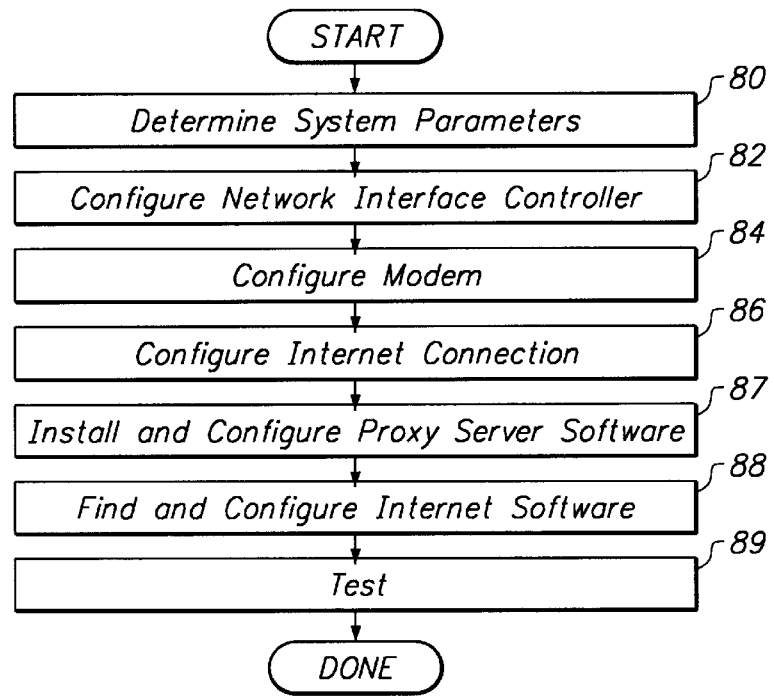
FIG. 4 is a flowchart showing the steps taken by automatic setup software for use with the card of the present invention.

A flowchart showing the steps of the automated setup process for card 30 is shown with reference to FIG. 4. First, at step 80, the setup software determines the system parameters of the host computer. These parameters may include information on the current hardware and software which is installed on the host computer, as well as other relevant parameters, depending on the operating system used on the host computer. On a host computer running the WINDOWS 95 operating system, by Microsoft, of Redmond, Wash., this step may consist of reading system parameter data from one or more files, such as the system registry. On systems where such information is not available in system files, this step may require a series of hardware and software tests to be performed.

Next, in step 82, the network interface controller is configured. Typically, this step involves assigning a network ID to the network interface controller, and configuring the operating system to handle the local area network protocol, preferably TCP/IP. On some systems, such as "PC-compatible" computers, it may also be necessary to assign hardware parameters, such as I/O port addresses or an interrupt request number to the network interface controller. Although this entire step can be handled automatically on most systems, the user is preferably given an option to override any of the automatic settings.

Next, in step 84, the modem hardware and software are configured. On a "PC-compatible" computer, this involves determining which communications port will be used to access the modem. The system may also request information from the user concerning the local telephone area code, and any prefix which must be dialed to access an outside telephone line.

In step 86 of the setup procedure, the setup software asks the user for information on the Internet service provider being used. This information will typically include the telephone number used to access the ISP, whether the ISP provides a static or dynamic network address, the domain name for the ISP, and the address of a name server associated with the ISP. Optionally, pre-configured settings may be provided for large ISPs, relieving users of these large ISPs from having to provide this information. The user may also be given an option at this point to automatically register with any of a number of ISPs, if the user does not already have an account with an ISP.

Next, in step 87, the setup software will automatically install the proxy server software, and use the parameters which have been determined by previous steps to configure the proxy server. In step 88, the setup software will search the host computer for common Internet applications, and, if possible, configure them to run through the proxy server. Finally, in step 89, the setup software tests the configuration to verify that the setup has been successful.

On all the other computers connected to the LAN, it is only necessary to apply steps 80, 82, and 89, to find the system parameters, configure the network interface controller, and configure any common Internet applications to use the proxy server on the host computer. If these other computers have network interface controllers that are compatible with the setup software provided with card 30, the same setup software can be executed on each of the other computers, performing only the needed steps.

It will be appreciated by one skilled in the art that the exact steps which must be performed to setup and configure the card of the present invention will depend on the type of host computer and operating system being used. Minor variations on the above-described steps may be used without diminishing the advantages gained through use of automatic setup software with a card constructed in accordance with the present invention.

Figure 5:
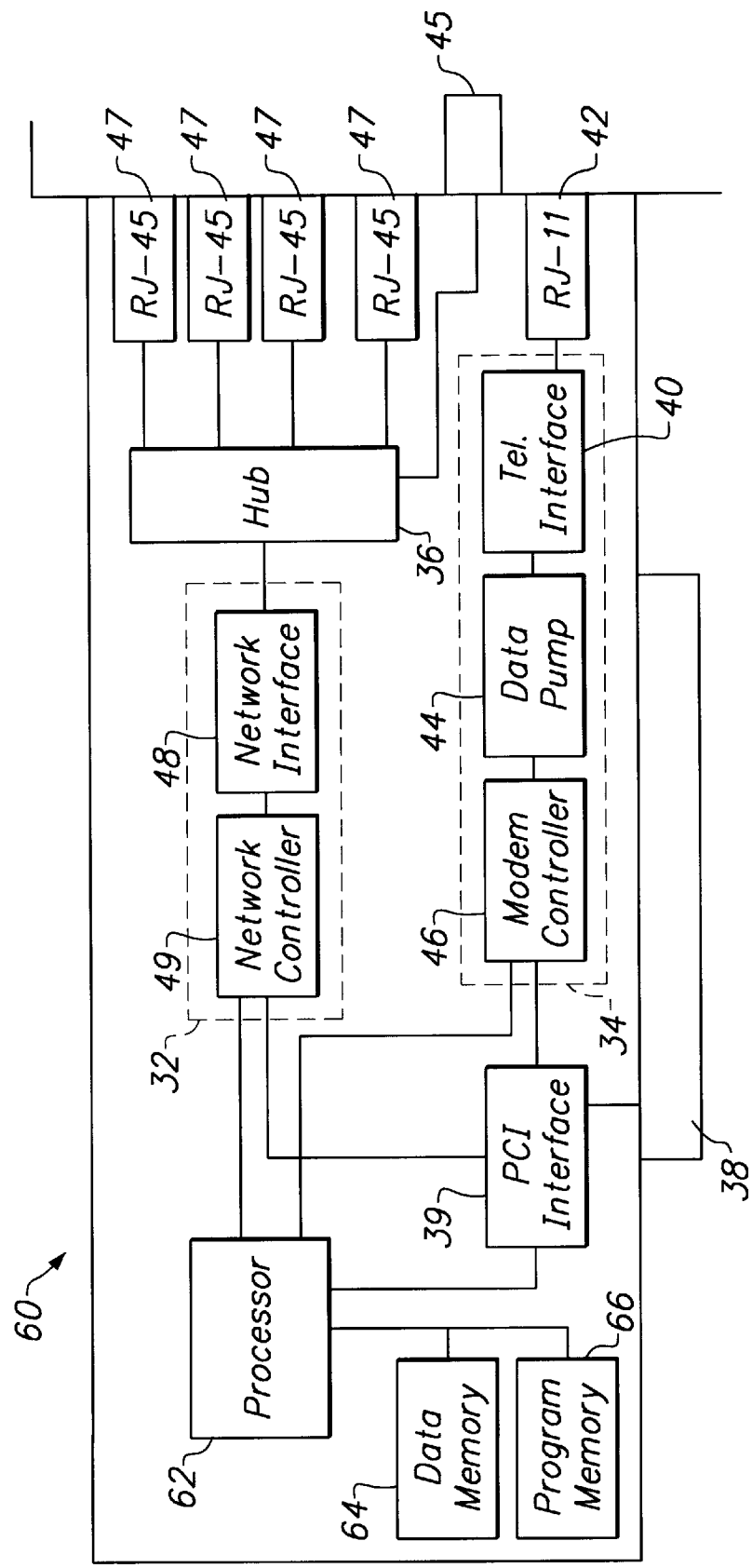
FIG. 5 shows an alternative embodiment of the card of the present invention.

Referring now to FIG. 5, an alternative embodiment of the card of the present invention is shown. Card 60 comprises all of the same components as card 30, discussed with reference to FIG. 2, including network interface controller circuitry 32, modem circuitry 34, and network hub circuitry 36. Additionally, card 60 includes processor 62, coupled to modem circuitry 34, network interface controller circuitry 32, PCI interface circuitry 39, data memory 64 and program memory 66.

In card 60 of FIG. 5, processor 62, data memory 64, and program memory 66 relieve the host computer of the burden of running a proxy server to route Internet traffic. Processor 62 is programmed to run standard proxy server software, which is stored in program memory 66. Program memory 66 is preferably non-volatile flash memory, which permits the proxy server software to be upgraded as necessary, and configuration parameters to be stored. Processor 62 uses data memory 64, which is preferably inexpensive DRAM, to store temporary data, and to buffer network traffic.

Processor 62 is preferably a relatively inexpensive microprocessor, such as a 486, developed by Intel, of Santa Clara, Calif., and manufactured by numerous vendors, or an ARM processor, developed by Advanced RISC Machines, of Cambridge, UK, and manufactured by numerous vendors. ARM microprocessors are available as macrocells, permitting them to be easily integrated into a single VLSI chip with the other circuitry of card 60.

Processor 62 may optionally be used to provide services other than simply running a proxy server to route Internet traffic. For example, processor 62 may also be programmed to receive faxes and voice mail from modem circuitry 34, and buffer them in data memory 64. Additionally, if processor 62 is a relatively powerful microprocessor, cost savings may be achieved by removing modem controller 46 and network controller circuitry 49, and programming processor 62 to perform these functions, in addition to routing Internet traffic.

While preferred illustrative embodiments of the present invention are described above, it will be evident to one skilled in the art that various changes and modifications may be made without departing from the invention. It is intended in the appended claims to cover all such changes and modifications which fall within the true spirit and scope of the invention.

What is claimed is:

1. A data communication device and software that enables a first personal computer to communicate with a wide area network and a local area network, the data communication device and software comprising:
   - a card configured to be plugged into a standard interface slot of the first personal computer;
   - interface circuitry disposed on the card, the interface circuitry connecting the card to the first personal computer to enable data communication between the card and the first personal computer;
   - modem circuitry disposed on the card and coupled to the interface circuitry, the modem circuitry enabling data communication between the first personal computer and the wide area network;
   - network interface controller circuitry disposed on the card and coupled to the interface circuitry, the network interface controller circuitry enabling data communication between the first personal computer and the local area network;
   - network hub circuitry disposed on the card and coupled to the network interface controller circuitry, the network hub circuitry interconnecting the card and the local area network,
   - proxy server software adapted to execute on the first computer to route data between the first personal computer, the local area network, and the wide area network; and
   - a programmed setup routine adapted to execute on the first personal computer to configure the first personal computer, the interface circuitry, the modem circuitry, the network interface controller circuitry, and the proxy server software.

2. The data communication device of claim 1, wherein the wide area network comprises an Internet connection.

3. The data communication device of claim 2, wherein the modem circuitry connects the card to a cable Internet service.

4. The data communication device of claim 2, wherein the data communication device further comprises:
   - a processor disposed on the card and coupled to the interface circuitry, the modem circuitry, and the network interface controller circuitry;
   - data memory disposed on the card and coupled to the processor; and
   - program memory disposed on the card and coupled to the processor.

5. The data communication device of claim 4, wherein the data communication device further comprises second modem circuitry disposed on the card and coupled to the interface circuitry, the second modem circuitry enabling increased bandwidth data communication between the first personal computer and the wide area network.

6. The data communication device of claim 4, wherein the processor is programmed to run proxy server software, the proxy server software routing data between the first personal computer, the local area network, and the Internet connection so that the first personal computer and the local area network are provided with access to the Internet connection.

7. The data communication device of claim 6, wherein the program memory comprises non-volatile flash memory, and the proxy server software is stored in the program memory.

8. The data communication device of claim 4, wherein the modem circuitry sends and receives fax transmissions, and receives voice mail, and wherein the processor is programmed to send and receive fax transmissions through the modem circuitry, and to receive voice mail through the modem circuitry.

9. The data communication device of claim 8, wherein the processor is further programmed to route fax transmissions and voice mail to the personal computer, and to the local area network.

10. The data communication device of claim 1, wherein the data communication device further comprises second modem circuitry disposed on the card and coupled to the interface circuitry, the second modem circuitry enabling increased bandwidth data communication between the first personal computer and the wide area network.

11. The data communication device of claim 1, wherein the interface circuitry conforms to an interface specification chosen from the group consisting of a PCI interface specification, an ISA interface specification, and a PCMCIA interface specification.

12. The data communication device of claim 1, wherein the network interface controller circuitry conforms to network standard chosen from the group consisting of Ethernet (IEEE 802.3), Fast Ethernet (100BASE-T), ATM, and FDDI.

13. The data communication device of claim 1, wherein the modem circuitry connects the card to a public telephone line.

14. The data communication device of claim 13, wherein the modem circuitry comprises:
   - a connector, for physically connecting the modem circuitry to a public telephone line;
   - telephone interface circuitry coupled to the connector, for interfacing the modem circuitry with the public telephone line;
   - modem data pump circuitry coupled to the telephone interface circuitry, the modem data pump circuitry including a telephone coder-decoder for communicating data through the telephone interface circuitry; and
   - a modem controller, for controlling the operation of the modem data pump and the telephone interface circuitry.

15. The data communication device of claim 14, wherein the connector comprises an RJ-11 jack.

16. The data communication device of claim 1, wherein the modem circuitry connects the card to an ISDN line.

17. The data communication device of claim 1, wherein the modem circuitry connects the card to a digital subscriber line.

18. The data communication device of claim 1, wherein the modem circuitry comprises a telephone line interface, and the first personal computer includes a host signal processor, programmed as a soft modem.

19. The data communication device of claim 1, the data communication device further comprising a plurality of ports disposed on the card and coupled to the network hub circuitry.

20. The data communication device of claim 19, wherein the plurality of ports comprise a plurality of RJ-45 jacks.

21. The data communication device of claim 19, the data communication device further comprising a cascade port disposed on the card and coupled to the network hub circuitry, the cascade port connecting the network hub circuitry to an external network hub.

22. The data communication device of claim 1, wherein the modem circuitry sends and receives fax transmissions, and receives voice mail, and wherein the personal computer is programmed to send and receive fax transmissions through the data communication device, and to receive voice mail through the data communication device.

23. The data communication device of claim 22, wherein the personal computer is further programmed to route fax transmissions and voice mail to the local area network.

24. A method of providing Internet access to a plurality of personal computers in a small office or home office environment, the method comprising steps of:

provoding a card comprising a network interface controller, a modem, and a network hub, the card configured to be installed in a first one of the plurality of personal computers;

attaching additional ones of the plurality of personal computers to the network hub on the card;

executing a setup program on the first one of the plurality of personal computers, the setup program configuring the first one of the plurality of personal computers and the network interface controller and modem on the card, and installing and configuring proxy server software on the first one of the plurality of personal computers;

establishing a connection to the Internet through the modem on the card; and executing the proxy server software on the first one of the plurality of personal computers to route data between the Internet and the plurality of personal computers.

25. The method of claim 24, wherein the step of executing the setup program further comprises steps of:

determining system parameters of the first one of the plurality of personal computers;

using the system parameters to configure the network interface controller;

using the system parameters to configure the modem;

configuring a connection to the Internet through an Internet service provider;

configuring the proxy server software; and configuring Internet applications on the first one of the plurality of personal computers to access the Internet through the proxy server software.

26. The method of claim 25, wherein the step of configuring a connection to the Internet further comprises a step of establishing a new account with an Internet service provider.

27. The method of claim 25, wherein the step of configuring a connection to the Internet further comprises selecting a configuration from a list of configurations corresponding to large Internet service providers.

28. The method of claim 24, further comprising a step of providing a network interface controller for each of the additional ones of the plurality of personal computers.

29. The method of claim 28, further comprising a step of executing setup software on each of the additional ones of the plurality of personal computers.

30. The method of claim 29, wherein the step of executing setup software on each of the additional ones of the plurality of personal computers further comprises steps of:

determining system parameters for each of the additional ones of the plurality of personal computers;

configuring the network interface controller of each of the additional ones of the plurality of personal computers; and configuring Internet applications on each of the additional ones of the plurality of personal computers to access the Internet through the proxy server software executing on the first one of the plurality of personal computers.

* * * * *